(12) United States Patent
Mohan et al.

(10) Patent No.: US 8,604,714 B2
(45) Date of Patent: *__Dec. 10, 2013__

(54) LIGHTING CONTROL

(71) Applicants: Tanuj Mohan, Mountain View, CA (US); Premal Ashar, Sunnyvale, CA (US); James William Danz, Sunnyvale, CA (US)

(72) Inventors: Tanuj Mohan, Mountain View, CA (US); Premal Ashar, Sunnyvale, CA (US); James William Danz, Sunnyvale, CA (US)

(73) Assignee: enLighted, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/625,044

(22) Filed: Sep. 24, 2012

(65) Prior Publication Data

US 2013/0020949 A1 Jan. 24, 2013

Related U.S. Application Data

(63) Continuation of application No. 12/639,303, filed on Dec. 16, 2009, now Pat. No. 8,344,660.

(51) Int. Cl.
*H05B 37/02* (2006.01)
(52) U.S. Cl.
USPC .......................... 315/307; 315/291; 315/308
(58) Field of Classification Search
USPC .................. 315/152–159, 291, 294, 307, 308
See application file for complete search history.

(56) References Cited

U.S. PATENT DOCUMENTS

| | | | |
|---|---|---|---|
| 5,101,141 | A | 3/1992 | Warner et al. |
| 5,179,324 | A | 1/1993 | Audbert |
| 5,191,265 | A | 3/1993 | D'Aleo et al. |
| 5,283,516 | A | 2/1994 | Lohoff |
| 5,812,422 | A | 9/1998 | Lyons |
| 6,057,654 | A | 5/2000 | Cousy et al. |
| 6,188,181 | B1 | 2/2001 | Sinha et al. |
| 6,342,994 | B1 | 1/2002 | Cousy et al. |
| 6,548,967 | B1 | 4/2003 | Dowling et al. |
| 7,309,985 | B2 | 12/2007 | Eggers et al. |
| 7,348,736 | B2 | 3/2008 | Piepgras et al. |
| 7,382,271 | B2 | 6/2008 | McFarland |
| 7,437,596 | B2 | 10/2008 | McFarland |
| 7,550,931 | B2 | 6/2009 | Lys et al. |
| 7,566,137 | B2 | 7/2009 | Veskovic |
| 7,623,042 | B2 | 11/2009 | Huizenga |
| 7,792,956 | B2 | 9/2010 | Choong et al. |
| 7,925,384 | B2 | 4/2011 | Huizenga et al. |
| 2004/0002792 | A1 | 1/2004 | Hoffknecht |
| 2005/0169643 | A1 | 8/2005 | Franklin et al. |
| 2006/0275040 | A1 | 12/2006 | Franklin |
| 2007/0057807 | A1 | 3/2007 | Walters et al. |
| 2007/0061050 | A1 | 3/2007 | Hoffknecht |
| 2007/0086128 | A1 | 4/2007 | Lane et al. |
| 2007/0215794 | A1 | 9/2007 | Cernasov et al. |
| 2008/0185597 | A1 | 8/2008 | Veskovic et al. |
| 2008/0244104 | A1 | 10/2008 | Clemente |
| 2008/0265796 | A1* | 10/2008 | Null et al. .................... 315/291 |
| 2009/0026966 | A1 | 1/2009 | Budde et al. |
| 2009/0179596 | A1 | 7/2009 | Willaert et al. |
| 2009/0195161 | A1 | 8/2009 | Lane et al. |

(Continued)

*Primary Examiner* — Jimmy Vu
(74) *Attorney, Agent, or Firm* — Brian R Short

(57) ABSTRACT

An apparatus and method of controlling a light are disclosed. One light apparatus includes a light and a controller. The controller is operative to detect a light adjusting trigger event, select a random delay time, and adjust the light, wherein the light adjustment occurs the random delay time after detecting the light adjusting trigger event.

21 Claims, 9 Drawing Sheets

(56) References Cited

U.S. PATENT DOCUMENTS

| | | |
|---|---|---|
| 2010/0034386 A1 | 2/2010 | Choong et al. |
| 2010/0135186 A1 | 6/2010 | Choong et al. |
| 2010/0264846 A1 | 10/2010 | Chemal et al. |
| 2010/0270933 A1 | 10/2010 | Chemal et al. |
| 2010/0295482 A1 | 11/2010 | Chemal et al. |
| 2010/0301777 A1 | 12/2010 | Chemal et al. |
| 2011/0031897 A1 | 2/2011 | Henig et al. |

* cited by examiner

LIGHTING CONTROL

RELATED APPLICATIONS

This patent application is a continuation of U.S. patent application Ser. No. 12/639,303, filed Dec. 16, 2009, titled "Lighting Control".

FIELD OF THE EMBODIMENTS

The described embodiments relate generally to lighting. More particularly, the described embodiments relate to distributed lighting control.

BACKGROUND

Lighting control systems automate the operation of lighting within a building or residence based upon, for example, preset time schedules and/or occupancy and/or daylight sensing. The Lighting systems typically employ occupancy sensors and/or daylight sensors to determine which lighting devices to activate, deactivate, or adjust the light level of, and when to do so. Occupancy sensors typically sense the presence of one or more persons within a defined area and generate signals indicative of that presence. Daylight sensors typically sense the amount of daylight present within a defined area and generate signals indicative of that amount. Typically, lighting systems receive the sensor signals at a central lighting controller.

The lighting systems are advantageous because they typically reduce energy costs by automatically lowering light levels or turning off devices and appliances when not needed, and they can allow all devices in the system to be controlled from one location.

Centrally controlled lighting systems can be disadvantageous because all decision making occurs at the controller. Therefore, if the controller becomes inoperative, all lighting devices in the system are no longer under automated control and some or all may not operate even manually. Similarly, if a connection to or from the controller is severed, the lighting devices served by that connection are no longer under automated control and also may not operate manually. Partial or system-wide functional changes, such as an immediate need to override current system settings (for example, during a fire or other emergency), cannot be made from anywhere but the controller.

It is desirable to have a method, system and apparatus for providing lighting devices that are independently controllable.

SUMMARY

One embodiment includes a light apparatus. The light apparatus includes a light and a controller. The controller is operative to detect a light adjusting trigger event, select a random delay time, and adjust the light, wherein the light adjustment occurs the random delay time after detecting the light adjusting trigger event.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 3 is a time-line that shows an example of a sequence of timing events as one of the independently controllable lights is powered on.

DETAILED DESCRIPTION

Figure 1:
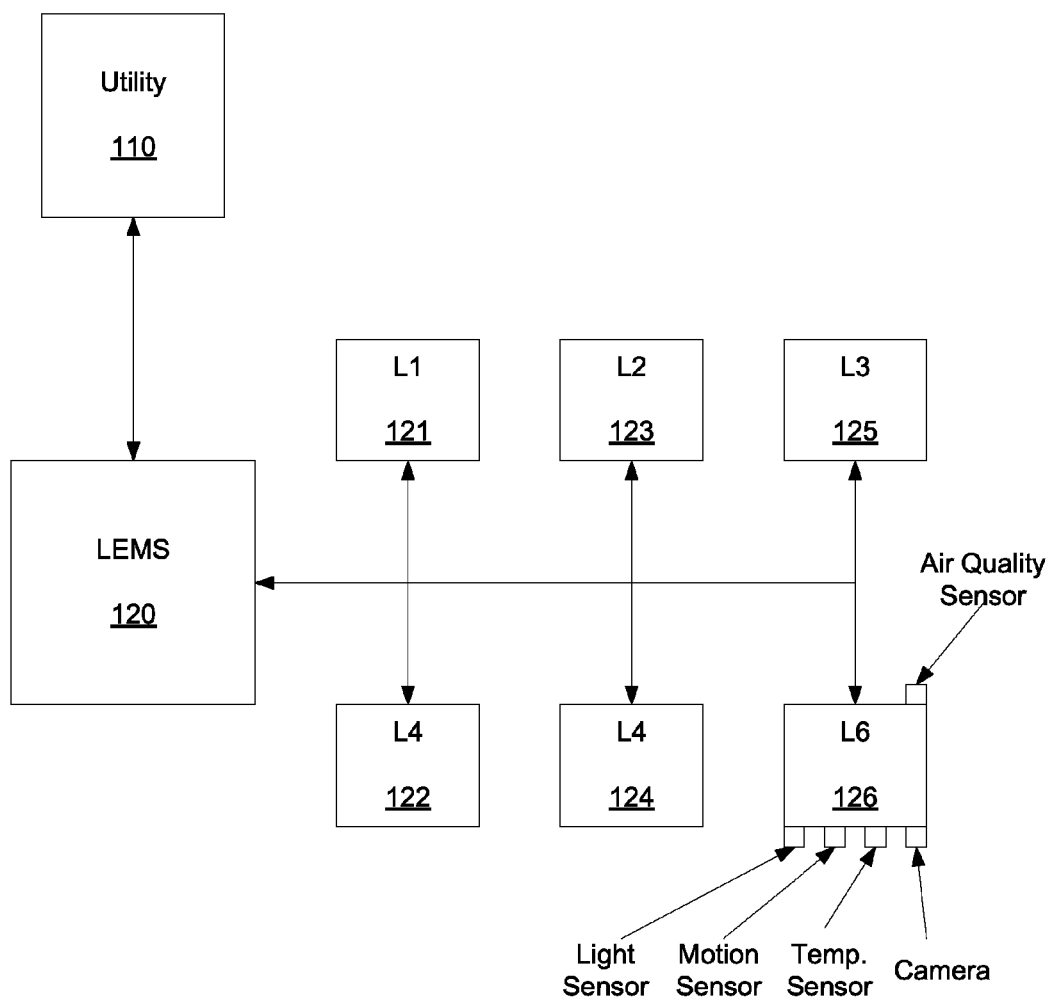
FIG. 1 shows an example of independently controlled light interfaced with a light and energy management system.

As shown in the drawings, the described embodiments are embodied in an apparatus and method for providing independently controllable lights. Embodiments of the independently controllable lights each include a controller, an actuator and sensors. This configuration provides advantages over conventional centrally controlled lighting system with distributed sensors.

FIG. 1 shows an example of a plurality of independently controlled lights 121, 122, 123, 124, 125, 126 interfaced with a light and energy management system (LEMS) 120. As shown, data can be exchanged between the LEMS 120 and each of the independently controlled lights 121, 122, 123, 124, 125, 126. The information from the LEMS 120 typically includes a light profile. Additionally, information can be conveyed from the LEMS 120 to the independently controlled lights in, for example, an emergency situation.

As shown, the independently controlled lights can include any number of sensors. The sensors can include, for example, a light sensor, a motion sensor, a temperature sensor, a camera, and/or an air quality sensor. Information obtained from the sensors can be used directly by the independently controlled light itself, or at least some of the information can be fed back to the LEMS 120. The LEMS 120 can interface with, for example, a utility server 110 which can provide utility information, such as, real-time energy costs, and demand response.

The LEMS shown as FIG. 1 is optional. That is, it is to be understood that the independently controllable lights are capable of operating without the LEMS.

Figure 2:
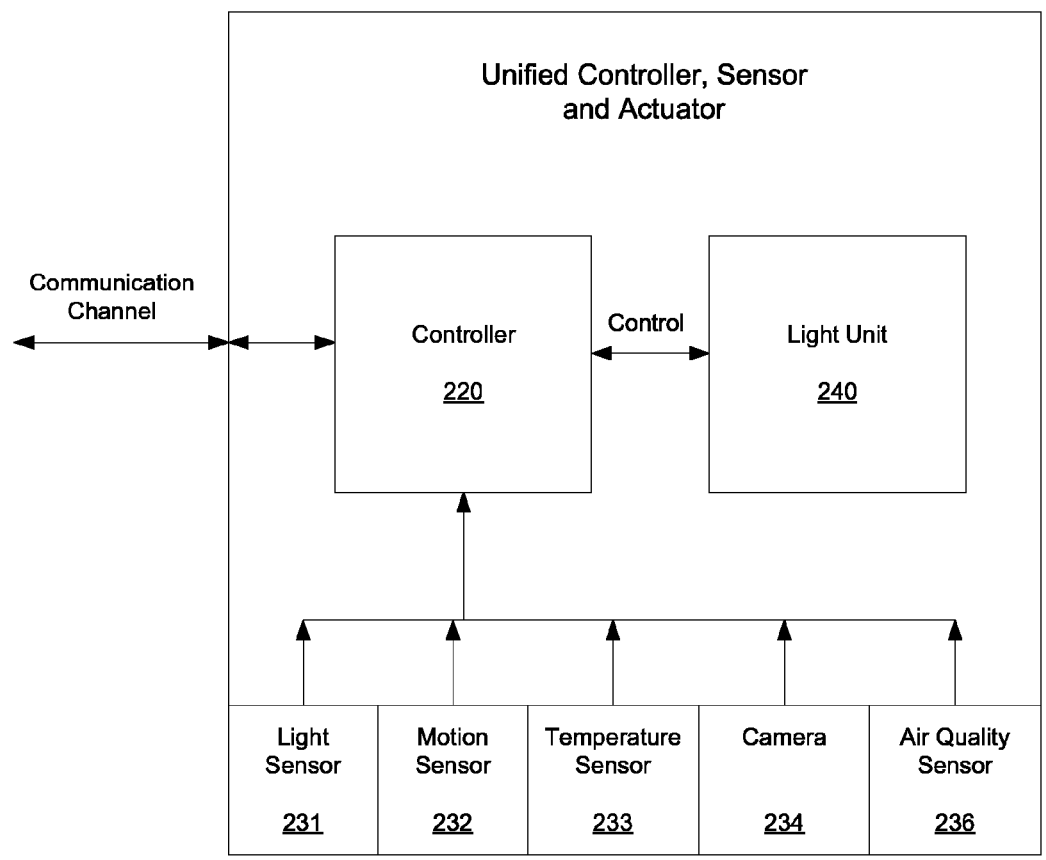
FIG. 2 shows an embodiment of an independently controllable light.

FIG. 2 shows an embodiment of an independently controllable light (unified controller, actuator and sensors). The independently controllable light includes a controller 220 that independently manages and controls the operation of a lighting unit 240. As previously described, the independently controllable light can include any combination of sensors, such as, a light sensor 231, a motion sensor 232, a temperature sensor 233, a camera 234, and/or an air quality sensor 236. Also, as described, the independently controllable light can receive profiles from elsewhere over a communications channel.

In FIG. 2 the independently controllable light includes the light unit. It is to be understood that the light unit could alternatively be external to the controller. For this embodiment, the controller can include outputs to effect the light level changes. For example, the outputs can control relays to turn lights on and off, and control 0-10 V or PWM (pulse width modulation) outputs for dimming. The controller 220 can include a standard chipset that integrates a microprocessor unit, and interface for communicating different program instructions, and several ports for communicating with electronic devices.

Upon being powered up, a power on mode can be initiated in which a default profile is used. Next, a discovery mode can be initiated in which the independently controllable light associates with the LEMS, or other neighboring lights. It should be noted, that due to independent control, installation of the lights can be done one light at a time without interfacing with an LEMS. However, if association with an LEMS is established, the independently controllable light can start periodically communicating data with the LEMS. The LEMS can then upload a different profile than the default profile.

In one example, when motion has not been detected for a specific interval of time, light produced by the light unit 240 is dimmed gradually or allowed to remain off. When motion is detected, software executed on the microcontroller 220 compares a sensed level of light with a target level of light. When the difference between the sensed level and the target level is substantial, the intensity of produced light can be adaptively changed depending upon a variety of factors including whether the measured light is higher or lower than the target level and the extent of the discrepancy between these levels. Additionally, other factors can be considered such as, sensor measurements of the recent past, the time of day, and/or other observed patterns. Additionally, the previously described light profile can influence the emitted light adjustments.

An embodiment includes adjusting the light by adjusting a wavelength of light emitted from the light. Embodiments include sensing the color temperature of the ambient light with a light sensor and simulating natural day light cycle.

Predetermined actions can be taken upon detected failure of sensors of the light. For example, the light level of the light can increase if a failure of the light sensor is detected. Occupancy can be assumed upon detection of a failure of the occupancy sensor.

Various methods can be used to adjust the light level of the light. For example, if the light is within a fixture, the light can be adjusted by powering off or powering on one or more lights in the fixture (such as a fluorescent light fixture with several bulbs). An alternate embodiment includes the target light intensity being established by a coordinated configuration sequence across many lights in an area. For an embodiment, according to the light profile the target light intensity is established at least in part by a coordinated configuration sequence across many lights in an area. A specific embodiment includes a pair of fluorescent light fixtures with three bulbs each, in which two of the six bulbs are controlled by one dimmable ballast, and four of the six bulbs are controlled by a separate dimmable ballast. The two-bulb ballast controls one bulb in each fixture, and the four-bulb ballast controls two bulbs in each fixture. Dimming is achieved by the dimmable ballasts by turning off two or four of the light bulbs while the rest remain on.

Particular configurations of lights include light ballasts that are inefficient below a certain percentage of brightness. To accommodate these light ballasts adjusting the light intensity below this percentage brightness includes dimming until off one or more lights gradually simultaneously with brightening the remaining lights to achieve the desired light level adjustment.

Figure 3:
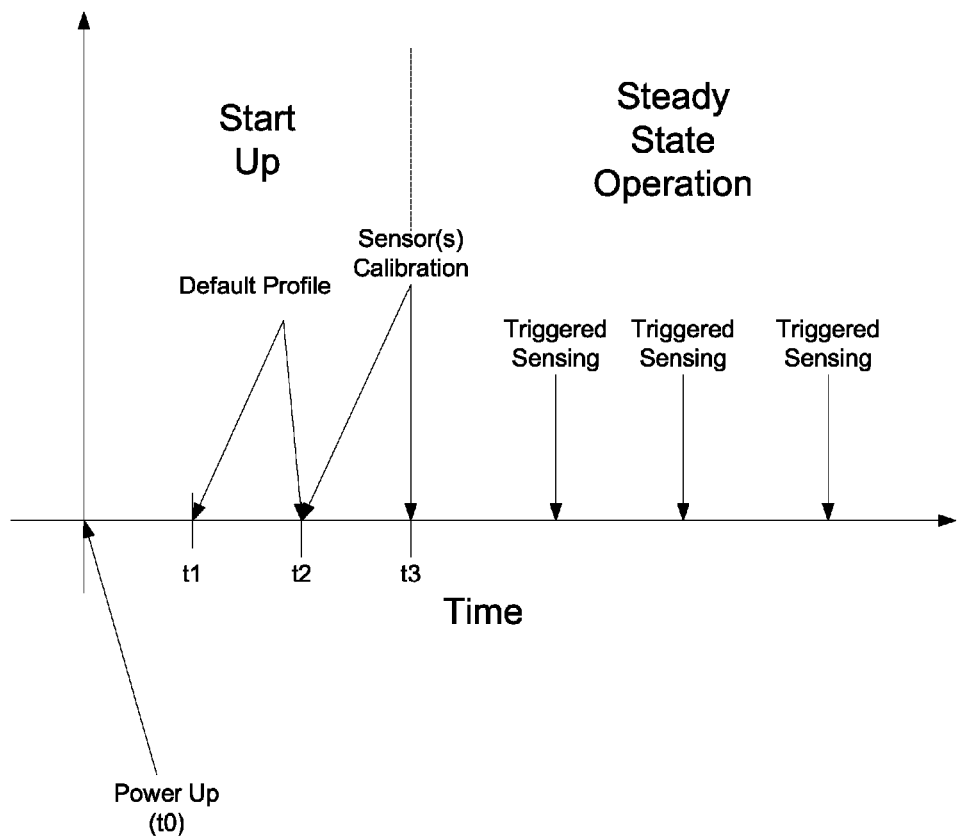

FIG. 3 is a time-line that shows an example of a sequence of timing events as an independently controllable light is powered on. As shown, at t0, the independently controllable light is powered on. At a later time t1, the independently controllable light uses a default profile (as mentioned, the LEMS can later upload a different profile). At a time t2, the independently controllable light can perform sensor calibrations. Thereafter, the independently controllable light can enter a steady state mode in which particular sensed events can trigger adjustment of the independently controllable light.

Figure 4:
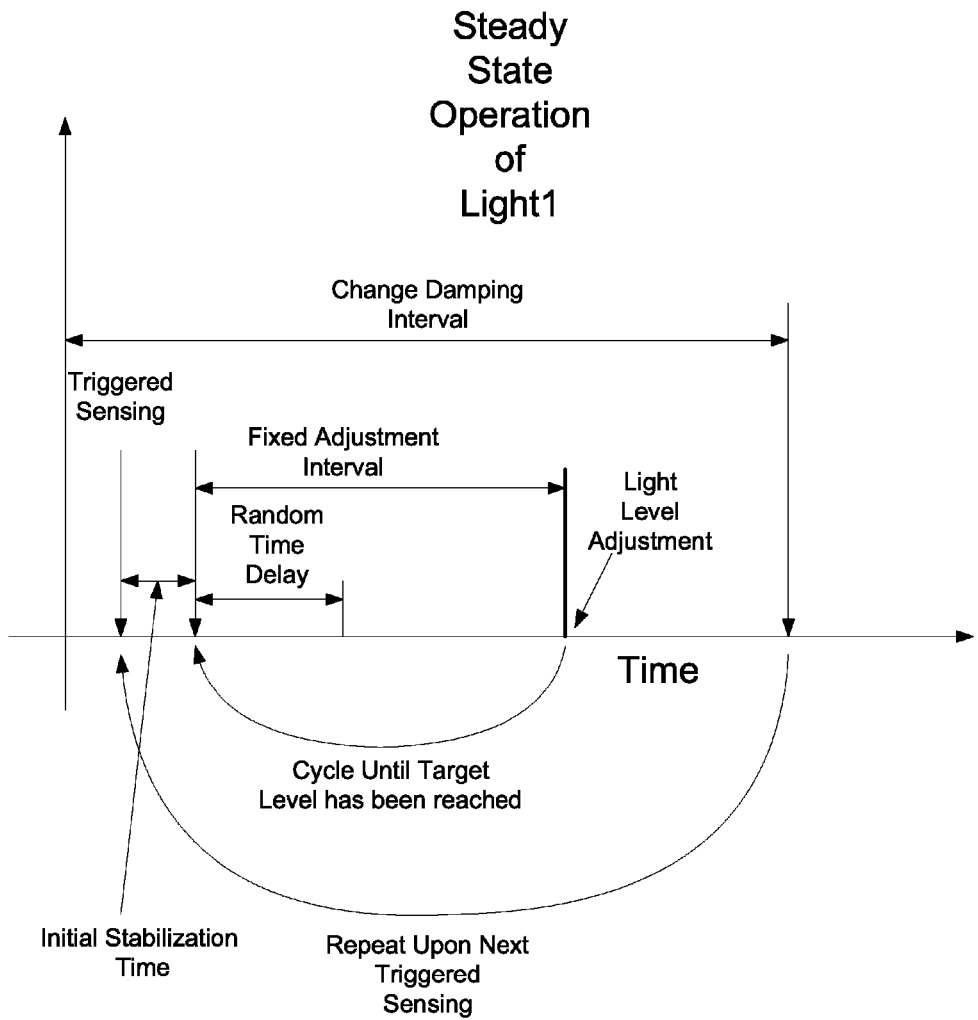
FIG. 4 is a time-line that shows an example of a sequence of timing events while an independently controllable light is operating.

FIG. 4 is a time-line that shows an example of a sequence of timing events during operation of an independently controllable light. As shown, a sensed event triggers the light adjustment which initiates a fixed adjustment interval after an initial stabilization time. Embodiments include the initial stabilization time when dimming the level of the light, and is potentially set to zero (not included) when increasing the level of the light. For this embodiment, a random time delay is initiated at the same time as the fixed adjustment interval. The random time delay is very useful when more than one of the independently controllable lights are located proximate to each other. The random time delay ensures that the proximate lights adjust their light levels at different times, preventing oscillations in which each light is adjusting for the other and also ensures uniform distribution of lighting.

After the random delay time, the light level is controllably adjusted. The adjustments continue until the target level of light has been reached. This can include any number of fixed adjustment cycles. Thereafter, the changed damping interval is included to damp or filter the changes in the light level. The damping interval can be skipped if the lights are not at an acceptable level and need to be increased. Light levels below a level can create safety issues. Therefore, the logic errs on the side of safety. After the duration of the change damping interval, a next sensed triggering causes the entire cycle to repeat.

The fixed adjustment interval introduces gradual changes in light levels and also allows proximate lights to effect gradual changes in a fair fashion. Multiple lights reacting to the same condition (for example, opening a blind and allowing sunlight to reach multiple lights) react at different times (due to the random delay) and have similar chances (Steps) to affect the desired target light change. The gradual changes in light levels do not distract occupants in neighboring areas.

The fixed change damping interval is introduced to prevent occupants within, for example, a room being lighted by the lights, from being irritated by continuous changes in condition that affect the lights. For example, on a partially cloudy day as the sun goes behind clouds and the light intensity sensed by the lights changes frequently, the occupant may be irritated with continuous brightening and dimming of lights. In this example, the logic would keep the lights at the brighter level to keep productivity high (that is, less irritating).

The initial stabilization time is used to filter transient increases in perceived light levels. This might happen, for example, if a person with white clothing is close to the light sensor, or for example, if external car headlights are received by the sensor causing an increase in its perceived light level.

Figure 5:
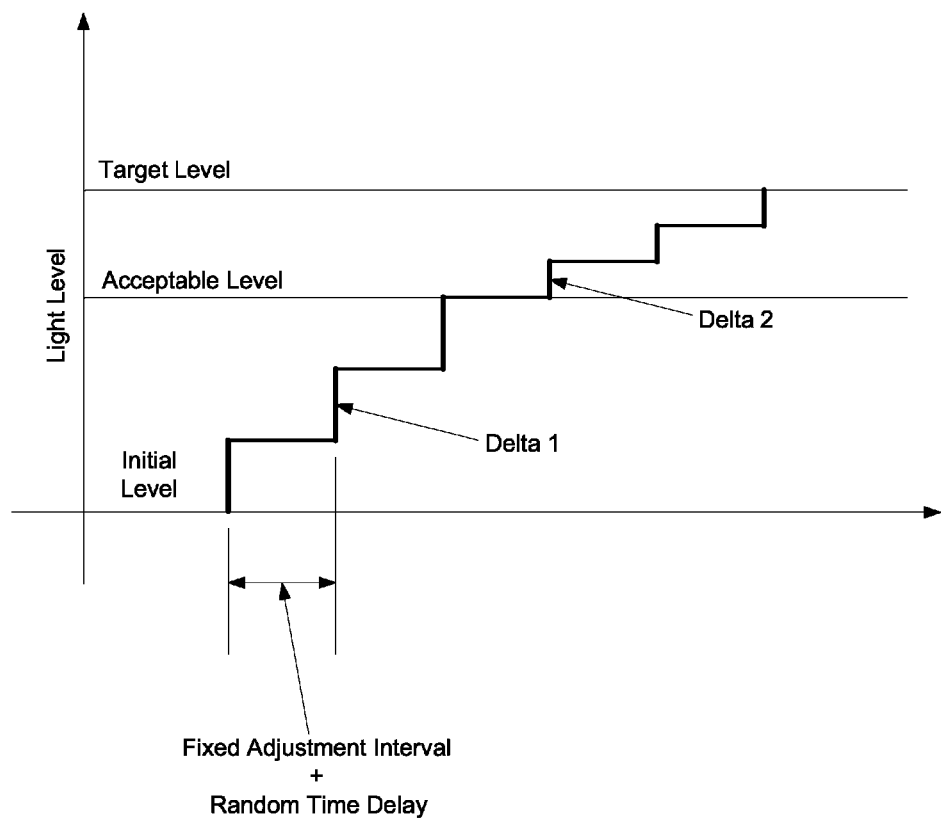
FIG. 5 is a time-line that shows an example of a sequence of events while an independently controllable light is increasing its light level.

FIG. 5 is a time-line that shows an example of a sequence of events while an independently controllable light is increasing its light level. As shown, the light level of the light is at an initial level at the point a triggering event is sensed or detected. The light level is then adjusted to a target level. The adjustment initially can include a level adjustment step size (delta 1) that is larger if the actual lighting level is below an acceptable level. Once the actual lighting level exceeds the acceptable level, the level adjustment step size (delta 2) can be deceased. The effect being that the light level changes more rapidly when increasing and the difference between the target and the present light level is still large. That is delta 1 is greater than delta 2. Note that as previously mentioned, the time between level changes is the fixed adjustment interval plus the random time delay.

Figure 6:
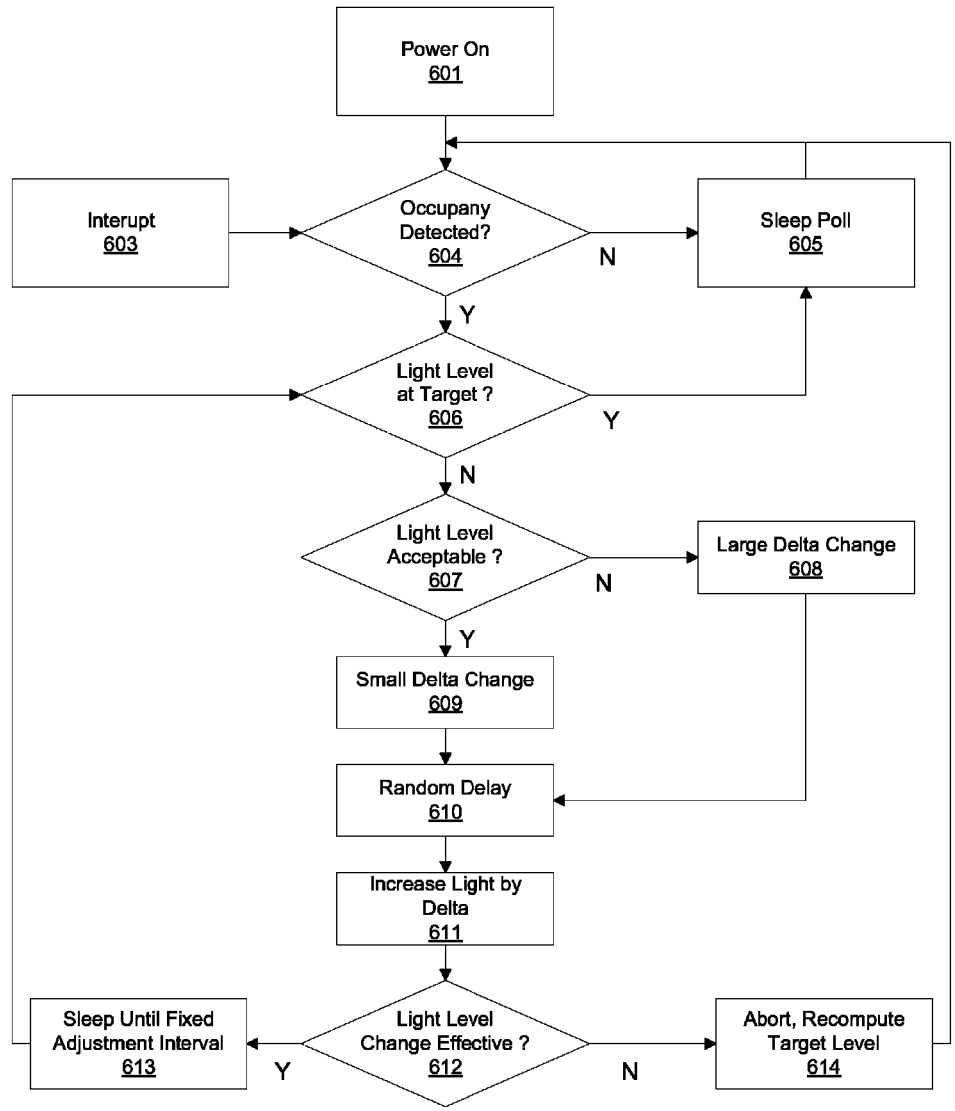
FIG. 6 is a flow chart that includes steps of an example a method of adjustably increasing a light level of a light fixture.

FIG. 6 is a flow chart that includes steps of an example of a method of adjustably increasing a light level of a light fixture. A step 601 includes powering on the light. A step 602 includes detecting occupancy in the vicinity of the light. A step 605 includes detecting occupancy by polling the motion sensor of the light at a regular interval. A step 603 includes detecting occupancy through an interrupt from a motion sensor of the light. If occupancy is detected then a step 606 includes checking if the light level needs to be adjusted. If light level needs adjustment, then a step 607 includes determining if the light level is at least at an acceptable level. If acceptable, then a step 609 includes selecting a small delta for adjustment to provide a gradual change. If not at an acceptable level, then a step 608 includes selecting a larger delta change for adjustment to provide a more rapid change. A step 610 includes introducing a random delay time. A step 611 increases the light level by selected delta. A step 612 includes checking if the light level change effected is realized. If effective, then a step 613 includes initiating a sleep period until the next fixed adjustment interval. If not effective, then a step 614 includes re-evaluating the current light level and starting a new cycle.

Figure 7:
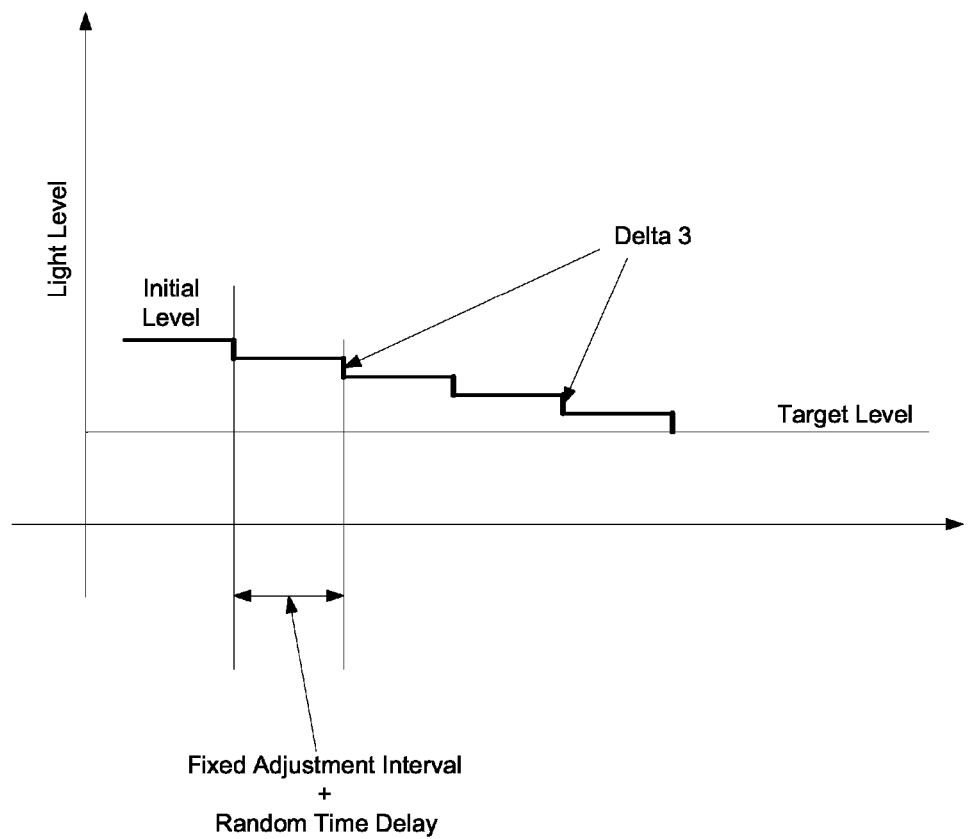
FIG. 7 is a time-line that shows an example of a sequence of events while an independently controllable light is decreasing its light level.

FIG. 7 is a time-line that shows an example of a sequence of events while an independently controllable light is decreasing its light level. As shown, the light level of the light is at an initial level at the point a triggering event is sensed or detected. The light level is then adjusted to a target level. The adjustment initially can include a level adjustment step size (delta 3). Generally, delta 3 is less than delta 1, and therefore, the lighting level increases at a greater rate than it increases.

Figure 8:
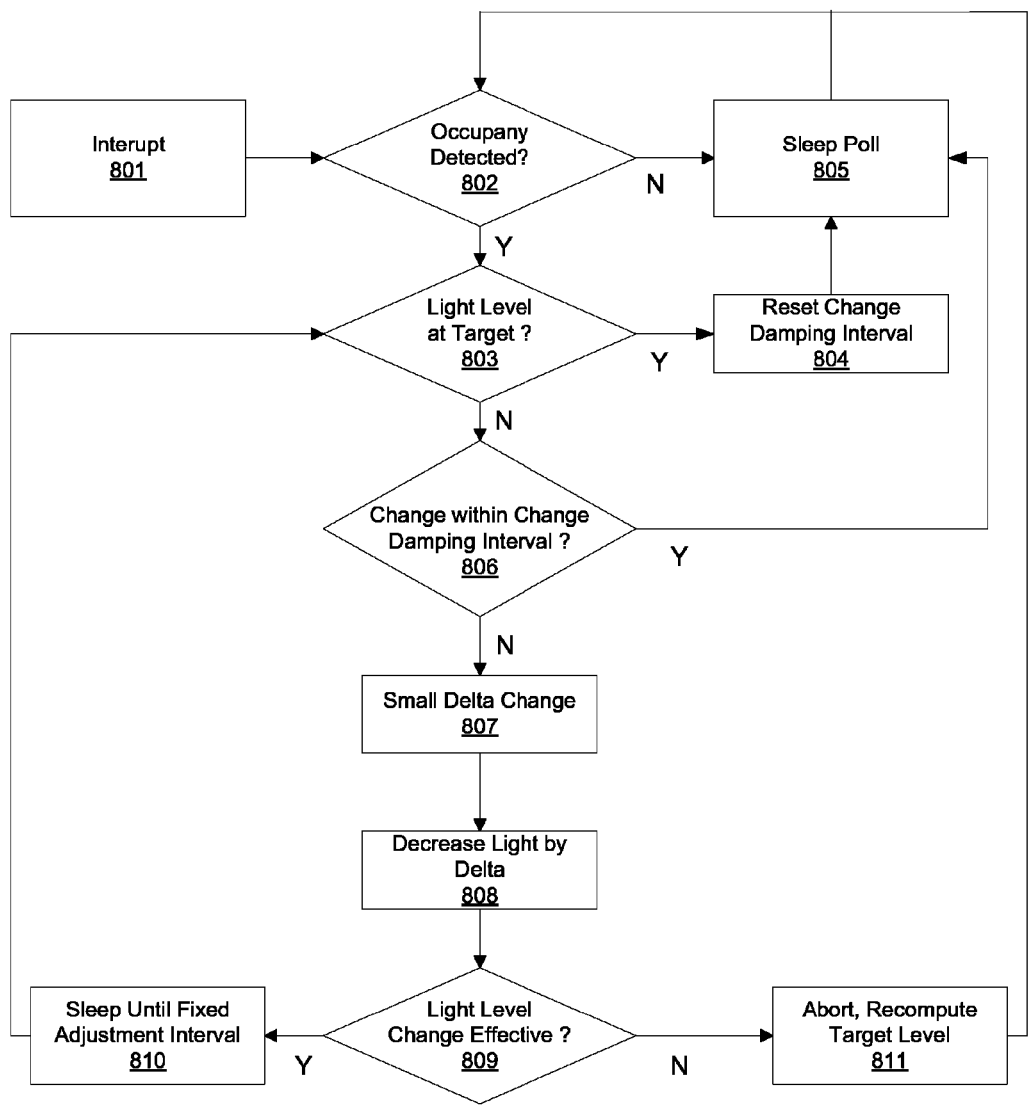
FIG. 8 is a flow chart that includes steps of an example a method of adjustably decreasing a light level of a light fixture.

FIG. 8 is a flow chart that includes steps of an example of a method of adjustably decreasing a light level of a light fixture. A step 802 includes detecting occupancy in the vicinity of the light. A step 805 includes detecting occupancy by polling the motion sensor at a regular interval. A step 801 includes detecting occupancy through an interrupt from a motion sensor. If occupancy is detected then a step 803 includes checking if the light level needs to be adjusted. A step 804 includes resetting the change damping interval. A step 806 includes checking if the light level adjustment falls within the change damping interval. If so, then a step 805 includes initiating a sleep poll interval. If not, then a step 807 includes selecting a small delta to ensure a gradual change. A step 808 includes decreasing the light level by the delta. A step 809 includes checking if the light level change effected is realized. If effective, a step 810 includes initiating a sleep cycle until the next fixed adjustment interval. If not effective, then a step 811 includes re-evaluating the current light level and starting a new cycle.

Figure 9:
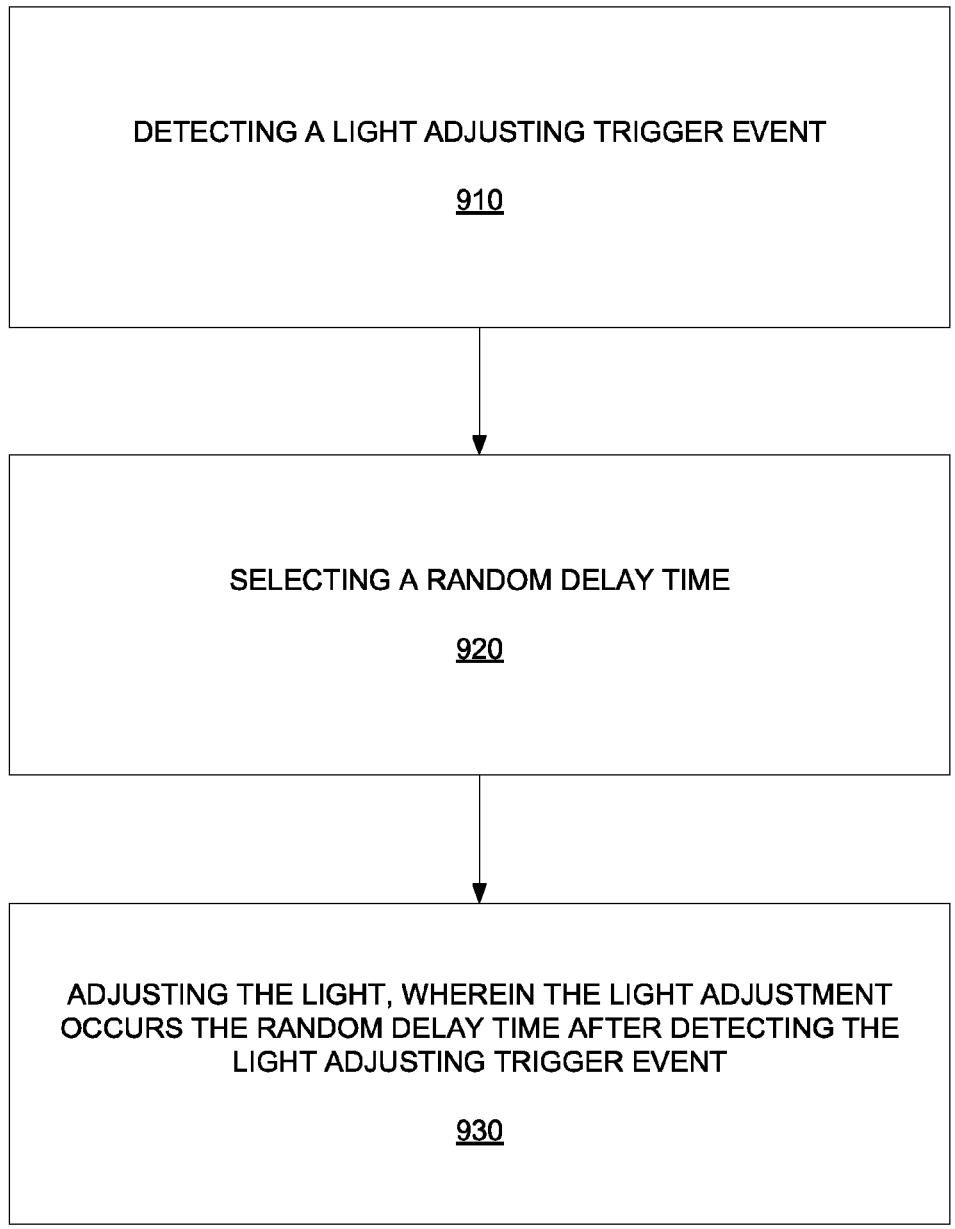
FIG. 9 is a flow chart that includes an example of a method of controlling a light fixture.

FIG. 9 is a flow chart that includes an example of a method of controlling a light. A first step 910 includes detecting a light adjusting trigger event. A second step 920 includes selecting a random delay time. A third step 930 includes adjusting the light, wherein the light adjustment occurs the random delay time after detecting the light adjusting trigger event.

For an embodiment, detecting a light adjusting trigger event includes sensing a light level change greater than a change threshold. That is, for example, sensing a light level different from a target light level by an amount that is greater than a difference threshold. Additionally or alternatively, the light adjusting trigger event can include sensing a change in room occupancy state, user input, or a state of emergency. For other embodiments, detecting a light adjusting trigger event includes detecting at least one of a change in time of day, a day of a week, a day of a year, a change in weather. For other embodiments, detecting a light adjusting trigger event includes receiving a demand response request or a real-time pricing request from, for example, the LEMS.

An embodiment includes adjusting the light only once per a fixed adjustment interval. Further, the light is adjusted the random delay time after the start of the fixed adjustment interval. The can further include periodically polling throughout the fixed adjustment interval to confirm that a state change that caused the light adjusting trigger event persists. If the state change that caused the trigger no longer persists, then a new light triggering event can be initiated.

As previously described, a light profile can be received that includes at least one light parameter. The at least one lighting parameter can influence the change threshold (either a percentage or an absolute value), the target light level, and/or the difference threshold (as either a percentage of an absolute value).

Additionally, embodiments include the at least one light parameter influencing the fixed adjustment interval and/or the change damping interval.

Embodiments include factors influencing the light profile. For example, the light profile can be based at least in part on the type of room or area. The light profile can be adaptively updated based at least in part on at least one of a productivity versus efficiency (PVE) scale, a daylight likelihood assessment, time of day, day of week/holidays, weather, emergency, demand response requests, real-time-pricing events.

An embodiment includes the light parameters being configured such that a light level higher than the target light level is handled differently than a light level that is lower than the target light level. Adjusting the light includes adjusting a light intensity of the light by an increment step, wherein the incremental step is a fraction of a difference between a present light intensity and a target light intensity.

For an embodiment, if the target is greater than the present light intensity, then the light intensity is adjusted at a faster rate if the present light intensity is below an acceptable level, and at a slower rate if the present light intensity is greater than the acceptable level. If the target is less than the present light intensity, then the light intensity is adjusted at a slower rate.

More specific embodiment includes after one incremental adjustment, checking if the measured light level remains such that further adjustment is necessary and, if so, adjusting the light a new random delay time after the remainder of the fixed adjustment interval and repeating this process until the measured light level is no longer such that further adjustment is necessary.

Although specific embodiments have been described and illustrated, the described embodiments are not to be limited to the specific forms or arrangements of parts so described and illustrated. The embodiments are limited only by the appended claims.

What is claimed:

1. A light apparatus, comprising:
   a light;
   a light sensor operative to generate a light sense signal;
   a motion sensor operative to generate a motion sense signal;
   a controller operative to:
   repeatedly detect a light adjusting trigger event based on the light sense signal or the motion sense signal;

select a random delay time for each light adjusting trigger event; and adjust the light, wherein the light adjustment occurs the random delay time after detecting the light adjusting trigger event; wherein when the light apparatus is placed proximate to other light apparatuses that also include selection of random delay times, the random delay times ensure that each of the other light apparatuses adjust a light level at a different time than the light apparatus.

2. The apparatus of claim 1, wherein the controller detecting the light adjusting trigger event comprises the light sensor sensing a light level change greater than a change threshold.

3. The apparatus of claim 1, wherein the controller detecting the light adjusting trigger event comprises at least one of the light sensor sensing a light level different from a target light level by an amount that is greater than a threshold difference, or the light sensor sensing a change in room occupancy state, user input, or a state of emergency.

4. The apparatus of claim 1, wherein the controller detecting the light adjusting trigger event comprises the controller detecting at least one of a change in time of day, a day of a week, a day of a year, a change in weather.

5. The apparatus of claim 1, wherein the controller detecting the light adjusting trigger event comprises the controller receiving a demand response request or a real-time pricing request.

6. The apparatus of claim 1, wherein the controller is further operative to adjust the light only once per a fixed adjustment interval.

7. The apparatus of claim 1, wherein the controller is further operative to adjust the light the random delay time after initiating the fixed adjustment interval.

8. The apparatus of claim 7, wherein the controller is further operative to periodically poll throughout the fixed adjustment interval to confirm that a state change that caused the light adjusting trigger event persists.

9. The apparatus of claim 8, wherein if the state change that caused the trigger no longer persists, then the controller is operative to initiate a new light triggering event.

10. The apparatus of claim 1, wherein the controller is further operative to receive a light profile, wherein at least one light parameter is included within the light profile.

11. The apparatus of claim 2, wherein the controller is further operative to receive a light profile, wherein at least one light parameter is included within the light profile, and wherein the change threshold as either a percentage or an absolute value is based on at least one of the light parameters.

12. The apparatus of claim 3, wherein the controller is further operative to receive a light profile, wherein at least one light parameter is included within the light profile, and wherein the target light level is based on at least one of the light parameters.

13. The apparatus of claim 3, wherein the controller is further operative to receive a light profile, wherein at least one light parameter is included within the light profile, and wherein the threshold difference is based on at least one of the light parameters.

14. The apparatus of claim 6, wherein the controller is further operative to receive a light profile, wherein at least one light parameter is included within the light profile, and wherein the fixed adjustment interval is based on at least one of the light parameters.

15. The apparatus of claim 10, wherein the controller is further operative to adaptively update the light profile based at least in part on at least one of a productivity versus efficiency (PVE) scale, a daylight likelihood assessment, time of day, day of week/holidays, weather, emergency, demand response requests, real-time-pricing events.

16. The apparatus of claim 3, wherein the controller is further operative to receive a light profile, wherein at least one light parameter is included within the light profile, and wherein the light parameters are configured such that a light level higher than the target light level is responded to differently than a light level that is lower than the target light level.

17. The apparatus of claim 1, wherein adjusting the light comprises the controller operative to adjust a light intensity of the light by an increment step, wherein the incremental step is a fraction of a difference between a present light intensity and a target light intensity.

18. The apparatus of claim 17, wherein if the target is greater than the present light intensity, then the controller adjusts the light intensity at a faster rate if the present light intensity is below an acceptable level, and at a slower rate if the present light intensity is greater than the acceptable level.

19. The apparatus of claim 17, wherein if the target is less than the present light intensity, then the controller adjusts the light intensity at a slower rate.

20. The apparatus of claim 17, wherein after one incremental adjustment, the controller is operative to check if the measured light level has reached a target level of light and, if the measured light level has not reached the target level of light, then adjusting the light a new random delay time after the remainder of the fixed adjustment interval and repeating this process until the measured light level has reached the target level of light.

21. A plurality of light apparatuses, each light apparatus comprising:
a light;
a controller operative to:
repeatedly detect light adjusting trigger events;
select a random delay time for each detected light adjusting trigger event; and
adjust the light, wherein the light adjustment occurs the random delay time after detecting each of the light adjusting trigger events;
wherein the selected random delay time ensures that each light apparatus adjusts a light level at a different time than other of the plurality of light apparatuses.

* * * * *